United States Patent Office 3,824,163
Patented July 16, 1974

3,824,163
ELECTROCHEMICAL SULFUR DIOXIDE
ABATEMENT PROCESS
Henri J. R. Maget, Los Altos, Calif., assignor to
Electronic Associates, Inc., Long Branch, N.J.
Filed July 19, 1972, Ser. No. 273,213
Int. Cl. C01d 7/34
U.S. Cl. 204—130
5 Claims

ABSTRACT OF THE DISCLOSURE

A process is provided for removing pollutant(s) from waste gases and electrochemically converting such pollutant(s) into desired form, wherein a waste gas stream containing pollutant(s) is scrubbed with a slurry of pollutant-adsorbent particles suspended in slightly acidic aqueous solution, thereby causing pollutant(s) to be adsorbed by the particles. The slurry of said particles is then electrochemically treated employing said slurry as a dispersed electrode, to convert the pollutant(s) into desired material, such as a useful product or into a less-toxic or less-noxious material. This process is particularly applicable to the removal of sulfur dioxide from waste gases by scrubbing such gases with an aqueous slurry of particulate carbon causing sulfur dioxide to be adsorbed by the carbon particles and electrochemical converting the sulfur dioxide to sulfuric acid, employing the slurry of carbon particles having sulfur dioxide adsorbed thereon as a dispersed electrode.

Apparatus for carrying out the above process is also provided.

FIELD OF THE INVENTION

The present invention relates to a process and apparatus for removing pollutants from waste gases and electrochemically converting the pollutants into desired products, such as useful products or less-toxic or less-noxious materials, and to apparatus for carrying out such process. More particularly, the present invention is directed to a process and apparatus for removing sulfur dioxide from waste gases and electrochemically converting the sulfur dioxide to sulfuric acid.

BACKGROUND OF THE INVENTION

Sulfur dioxide is produced as an undesirable by-product in myriad of chemical processes. For example, sulfur dioxide is produced in the smelting of ores and is present in smelter gases in relatively high concentrations, for example, up to 7% or more. Another source of sulfur dioxide is the combustion of hydrogen sulfide from oil refining, coke-oven operation, and the refining of natural and manufactured gas. The widespread combustion of fuels, such as petroleum oil, natural and manufactured gases, and coal, particularly the latter, produces enormous quantities of sulfur dioxide in the form of dilute flue gases, which are for the most part vented to the atmosphere. It is estimated that upwards of 30 million tons of sulfur dioxide are emitted into the atmosphere each year in the United States due to the combustion of fuel oil and coal. Of this amount about 25 percent is produced in the generation of electric power.

Contamination of the atmosphere by sulfur dioxide, whether present in dilute concentration of 0.05 to 0.3 volume percent, as in power plant flue gases, or in higher amounts of 5 to 10 percent, as in ore roaster gases, has been a public health problem for many years. Sulfur dioxide presents two potential hazards to man: one is its physiological action as an irritating, asphyxiant gas; the other is its freezing action when in contact with the skin or other tissues in the form of a liquefied low-boiling gas.

Green plant life is far more sensitive to sulfur dioxide gas than are man and animals. Injury to vegetation may occur at ground-level concentrations under 1 p.p.m. The damaging effects of sulfur dioxide on plants and animals, particularly, in the vicinity of smelters and other industrial process and power plants, has led to regulations designed to limit the amount of atmospheric contamination. Accordingly, it is a growing practice to remove sulfur compounds from waste-process gases and convert these sulfur compounds to useful products or less-toxic or less-noxious materials.

Many methods have been proposed for removing sulfur dioxide from waste gases. Processes based upon catalytic oxidation of sulfur dioxide to sulfur trioxide and formation of sulfuric acid by reaction with water have been described. Other proposed processes employ adsorbent materials such as chalk, carbonaceous materials and alkaline materials, usually in aqueous suspension to adsorb the sulfur dioxide. U.S. Pat. No. 2,984,545 discloses the use of a mixture of manganese dioxide and lower oxides of manganese in aqueous suspension for absorption of sulfur dioxide, followed by calcination of the thus formed manganese sulfate to regenerate manganese oxide. U.S. Pat. No. 2,992,884 discloses the use of an alkali metal oxide on an alumina or chromia support for absorption of sulfur dioxide followed by regeneration by treatment with a hot reducing gas.

U.S. Pat. No. 2,618,592 to Horvitz discloses a method for the removal of sulfur dioxide from waste gases wherein a scrubbing medium is formed by passing industrial waste acid liquors through a multiple series of electrolytic cells. The liquor issuing from the electrolytic cells then flows to a scrubbing tower where it is utilized as the washing medium to scrub sulfur dioxide from the waste gases.

U.S. Pat. No. 3,150,923 to Bienstock discloses a process for the removal of sulfur dioxide from gases in which manganese oxide is used as an absorbent material for the sulfur dioxide. Sulfur dioxide reacts with the manganese oxide to form manganese sulfate, and the manganese sulfate can then be treated (electrolytically) to regenerate the manganese oxide and to give off various sulfur or sulfate compounds such as sulfuric acid.

U.S. Pat. No. 3,486,852 to Tamura et al. relates to an adsorption process for removing sulfur oxides including sulfur dioxide from waste gases by using active carbon as the adsorbent. The adsorbed material is then rinsed with water and the carbon is thereby desorbed and regenerated. Dilute sulfuric acid is formed by heating of the sulfur dioxide and the water.

U.S. Pat. No. 3,524,801 to Parsi discloses a cyclic process for the removal of sulfur dioxide from waste gases with the recovery of a portion of the sulfur dioxide as sulfuric acid. A three compartment diaphragm type electrolytic cell is utilized which employs an alkali metal sulfate salt and converts it into the corresponding acidic and basic components by electrolytic action. Sulfur dioxide is absorbed into the aqueous basic solution produced by the electrolytic cell which results in the formation of a predominantly bisulfite solution. The bisulfite solution is then electrolytically oxidized from bisulfite to bisulfate. The resulting solution is evaporated to produce crystals of the alkali metal salt, which are redissolved in water and recycled to the electrolytic cell to once again be converted to the acidic and basic components. Sulfuric acid remains as a mother liquor from the crystallization and is withdrawn and collected as a by-product of the process.

In yet another process for the removal of sulfur dioxide from flue gases, the flue gases are scrubbed in an absorption tower with a sodium hydroxide solution to produce a mixture of sodium bisulfite, sodium sulfate and sodium bisulfate. The addition of dilute sulfuric acid to the scrubbed gases drives off surplus sulfur dioxide and oxidizes all compounds to sodium sulfate. The heart of the process consists of an electrolytic cell, which allows for the recovery of the sodium hydroxide solution by electrolysis, while producing dilute sulfuric acid, hydrogen and oxygen. Power requirements necessary to regenerate most of the fuel needs are considerable mainly due to a rather inefficient electrolytic process.

Most of the research and development work of electrochemical processes conducted to date, such as those described in the aforementioned prior art patents, has been associated with conventional stationary or flow-by electrodes. Various types of such electrodes for low temperature operation of fuel cells or single electrode studies for oxidation and/or reduction of active species, have been utilized. The best known are probably sintered metal electrodes, vacuum deposited electrodes on organic supports, metallic diffusion electrodes (Ag/Pd, Pd), flexible organically bonded compressed powder electrodes (as has been applied in ion exchange membrane fuel cells) or graphite electrodes. All of these electrodes present characteristic interfaces between the conducting electrolyte (liquid or solid) and the gas phase (oxidant or reducing fuel). Reaction rates on these electrodes are associated with mass transport processes through thin films covering discrete regions in the electrode structure.

It is apparent that for such electrodes only the fraction of the total electrode surface which is in contact with the electrolyte is available for the electrochemical reaction. Since the electrolyte offers a high resistance of mass transport to the electrode surface surrounded by the electrolyte, the reaction zone is limited to discrete zones in individual electrode pores. Thus, where convention stationary or flow-by porous electrodes are employed in electrochemical cells for conversion of pollutants to desired materials, such as for conversion of sulfur dioxide to sulfuric acid, such cells are uneconomical to operate in view of the mass-transfer limitations thereof.

Many of the earlier developed absorption processes, such as aromatic amine or the aqueous ammonia processes as well as those mentioned hereinbefore, are economically suited only for gas streams some 3–30 times richer in sulfur dioxide than power plant flue gases. For example, smelter gases running from 1 to 7% in sulfur dioxide concentration (in the usual roasting processes) are suitable for these processes. However, such prior art processes are inefficient when the concentration of the sulfur dioxide in the waste gas is less than 1 percent (for example, when the concentration of sulfur dioxide is 0.1 to 0.4% in waste gases produced from the burning of coals and oils containing 2 to 4% sulfur). Although the percent of sulfur dioxide in such gases is small, the total quantity of sulfur dioxide may be very large.

Another objection to many prior art processes is the lack of provision for a practical method for the recovery of the sulfur dioxide in usable form as well as for regeneration of the absorbent material.

A still further objection to prior art processes employing liquid phase absorption techniques is that such processes act to cool the treated gas which subsequently has a higher density and tends to settle in the vicinity of the stack. As a result local pollution may become worse even though the amount of sulfur compounds emitted in the atmosphere is reduced.

Frequently, where many of the above-mentioned prior art systems are employed as add-on pollutant removal systems to existing plants, large power requirements are necessary in operating the add-on system. Furthermore, such add-on processes do not eliminate carbon dioxide initially and thus require the handling of large combustion gas loads. In addition, oxides of nitrogen have to be removed from the stack gases or combustion temperatures controlled to reduce its generation in order that sulfur dioxide may be efficiently removed from the stack gases.

Accordingly, it is clear that prior art procedures for removal of pollutants, such as sulfur dioxide, from waste gases and conversion of such pollutants into desired materials are far from satisfactory in that they are inefficient and uneconomical to operate.

SUMMARY OF THE INVENTION

It has now been found that sulfur dioxide and/or other pollutants such as carbon monoxide, hydrocarbons, ammonia, hydrazine, hydrogen sulfide, and oxides of nitrogen can be effectively and efficiently removed from waste gases and electrochemically converted to useful products or less-toxic or less-noxious materials without the disadvantages associated with prior art processes.

The process for removal of pollutants from waste gases and electrochemically converting such pollutants into desired forms, in accordance with the present invention, comprises treating a waste gas stream containing pollutants to be removed with a slurry of particles of pollutant-adsorbent material suspended in aqueous solution to cause the pollutants to be adsorbed on the suspended particles and electrochemically treating the aqueous slurry of the particles having pollutants adsorbed thereon to convert the pollutants into desirable products or less-toxic or less-noxious materials. This process is characterized in that the electrochemical treatment is carried out employing the slurry of particles having pollutants adsorbed thereon and obtained in the pollutant removal step, as an electrode of the electrochemical cell utilized.

It is indeed surprising and unexpected that the very slurry of particulate adsorbent material used to remove pollutants from waste gases, the particles of which have pollutant adsorbed thereon, can directly be used as an now, electrochemical cells employed for converting pollutants into desired materials. To the contrary and until now, electrochemical cells employed for converting pollutants (such as sulfur dioxide) into desired materials (such as sulfuric acid) utilized conventional stationary flow-by electrodes. As noted previously, the result was a rather inefficient electrolytic process consuming large amounts of power and requiring rather high concentrations of pollutants to operate effectively.

Furthermore, until now, the use of slurry or dispersed-type electrodes was limited solely to esoteric and theoretical scientific experimental functions as described in a paper entitled "The Dispersed Electrode" presented at the October 1966 meeting of the Electrochemical Society, Philadelphia, Pa., by the applicant. It was not appreciated that electrochemical cells employing a dispersed electrode could have industrial application. Furthermore, it was not appreciated that the output from a particular industrial process could serve as a dispersed electrode, namely that an aqueous slurry of particles having pollutant adsorbed thereon obtained from a gas scrubbing process could serve as a dispersed electrode.

The process of the invention is particularly adapted for removal of sulfur dioxide from waste gases and electrochemically converting the sulfur dioxide into sulfuric acid. The process of the invention can be so employed regardless of the sulfur dioxide concentration in the waste gases to be treated or in the slurry of particulate material having sulfur dioxide adsorbed thereon used as the dispersed electrode.

Further and in accordance with the present invention, apparatus is provided for the removal of pollutants from waste gases and conversion of removed pollutants into desired materials, comprising: waste gases scrubbing means for contacting waste gases containing pollutants with a slurry of pollutant adsorbent particles to effect removal of pollutants from said waste gases; and an electrochemical cell in communication with said waste gases scrubbing means, said electrochemical cell comprising an anode, a cathode and an electrolyte, one of said anode and cathode comprising a stationary electrode and the other electrode comprising a slurry, dispersed or moving electrode, said electrochemical cell further comprising a metallic cell compartment for receiving an aqueous slurry of particles having pollutants adsorbed thereon from the waste gases scrubbing means, said slurry functioning as an electrode and the surface of said metallic compartment functioning as a current collector and reaction site for reaction of pollutants and water, and said electrolyte comprising the aqueous portion of said aqueous slurry. In addition, a potential source across the electrochemical cell, and separation means for separating the reaction mixture from the electrochemical cell into product and slurry phases are also provided.

The above apparatus may optionally include means for concentrating the product collected from the above separation means, as well as slurry recycle means for recycling slurry from the separation means back to the waste gases scrubbing means. Where slurry recycle means is employed, the recycle means may include means for diluting slurry to the desired concentration.

The term "slurry-," "dispersed" or "moving" electrode as employed herein refers to the aqueous slurry of particles having pollutant adsorbed thereon.

It will be appreciated by those skilled in the art that the terms "adsorb," "adsorption," "adsorbent," "adsorbing" and the like primarily refer to that process by which pollutant(s) adhere to the surface of solid particles; however, these terms will also be inclusive of the process by which pollutants are taken up into the interstices of the solid particles or absorbed therein.

Perhaps the main advantage of the process and apparatus of the invention is its flexibility in being capable of handling substantially any type of waste gases regardless of the concentration of pollutants therein as opposed to prior art systems capable of handling gases of only very specific pollutant concentrations. Thus, where many pollutant removal processes are specifically tailored to stationary fuel combustion sources and are not applicable to richer gases, as encountered in smelting operations, the present system can be employed as an add-on process to substantially any existing plants and is capable of handling substantially all types of waste gases notwithstanding the concentration of pollutants present therein. The electrochemical portion of this invention makes use of the slurry of particles having pollutants adsorbed thereon as an electrode and is not limited in use by the concentration of pollutants adsorbed on the slurried particles and/or present in the slurry. Efficiency of operation is maintained by regulation of concentration of pollutant in the slurry fed to the electrochemical cell for example by varying the amount of water in the slurry, and by regulation of residence time and circulation rate of such slurry within the cell.

Furthermore, the use of the slurry-, dispersed- or moving electrode in the electrochemical step as noted is far and away more efficient than conventional electrodes. In conventional stationary or flow-by porous electrodes, reaction rates are controlled by mass transfer from the gas-liquid interface to the electrode surface. Electrode currents may be rather small mainly because mass transfer area is limited to a small defined fraction of the electrode. In order to avoid such limiting processes in conventional flow-by electrodes, rather well defined porous structures are necessary, or boundary layer thicknesses have to be reduced by artificial means such as by rotation or vibration. In the case of slurry electrodes, as employed in the present invention, such transport processes are appreciably increased since the slurry of particles having pollutants adsorbed thereon is employed as an electrode and the surface of each dispersed particle is essentially completely available for mass transfer processes and can contribute to the electrochemical process. Accordingly, the use of the slurry or dispersed electrode in the electrochemical cell employed in the invention results in a substantially more efficient and economical process than now presently employed, such as to convert sulfur dioxide to sulfuric acid by electrochemical techniques.

The slurry electrode employed in the present invention is, in effect, a catalytic electrode serving the dual function of providing catalytic activity and electrode conduction. Where conventional stationary electrodes are employed as catalytic electrodes, catalytic activity is severely hampered in that such activity is associated with surface area, which is largely inactive. This limitation, of course, will also severely restrict electrode conduction. However, in the present invention, where a slurry or dispersed or moving electrode is employed, the catalytic activity and electrode conduction characteristics of the electrode are separated in that the suspended particulate material having pollutant adsorbed thereon acts primarily as an electro-catalyst and the metallic cell compartment or metallic conductor acts as current collector. In addition, the aqueous solution portion of the slurry can also be employed as the electrolyte.

The electrochemical portion of the present invention can be carried out employing relatively low temperatures as compared to the temperatures necessary in carrying out prior art electrolytic procedures for these purposes. In addition, the invention is based on oxidation (or reduction), rather than true electrolysis, and thus requires considerably less parasitic power as compared to prior art systems.

The system of the invention is particularly advantageous in that it eliminates carbon dioxide in its initial steps. Thus, the present system does not require the handling of large combustion loads as are encountered in prior art systems.

DESCRIPTION OF THE FIGURES

The process and apparatus of the invention are illustrated in the accompanying Figures wherein:

Referring to the Figures, FIG. 1 illustrates a system applicable to the removal of sulfur dioxide from waste gases and conversion of the sulfur dioxide to sulfuric acid. Scrubbing tower 10 includes waste gases inlet 12, inlet 14 for aqueous slurry comprising particulate pollutant-adsorbent material such as carbon particles. However, metals and metal oxides which are stable and substantially corrosion resistant under the conditions encountered in the scrubbing tower and electrochemical cell, while being catalytically active, may be employed as catalysts. Examples of such materials are the noble metals such as platinum, iridium, rhodium and palladium as well as metal oxides such as tungsten oxide, tantalum oxide and platinum oxide. These catalysts may be supported on active or inactive corrosion resistant carriers such as carbon, glass, graphite or conventional metal or metal oxide carriers, which may, but need not, be an electrical conductor such as tungsten oxide, tantalum oxide, quartz and other silicon oxides.

Figure 1:
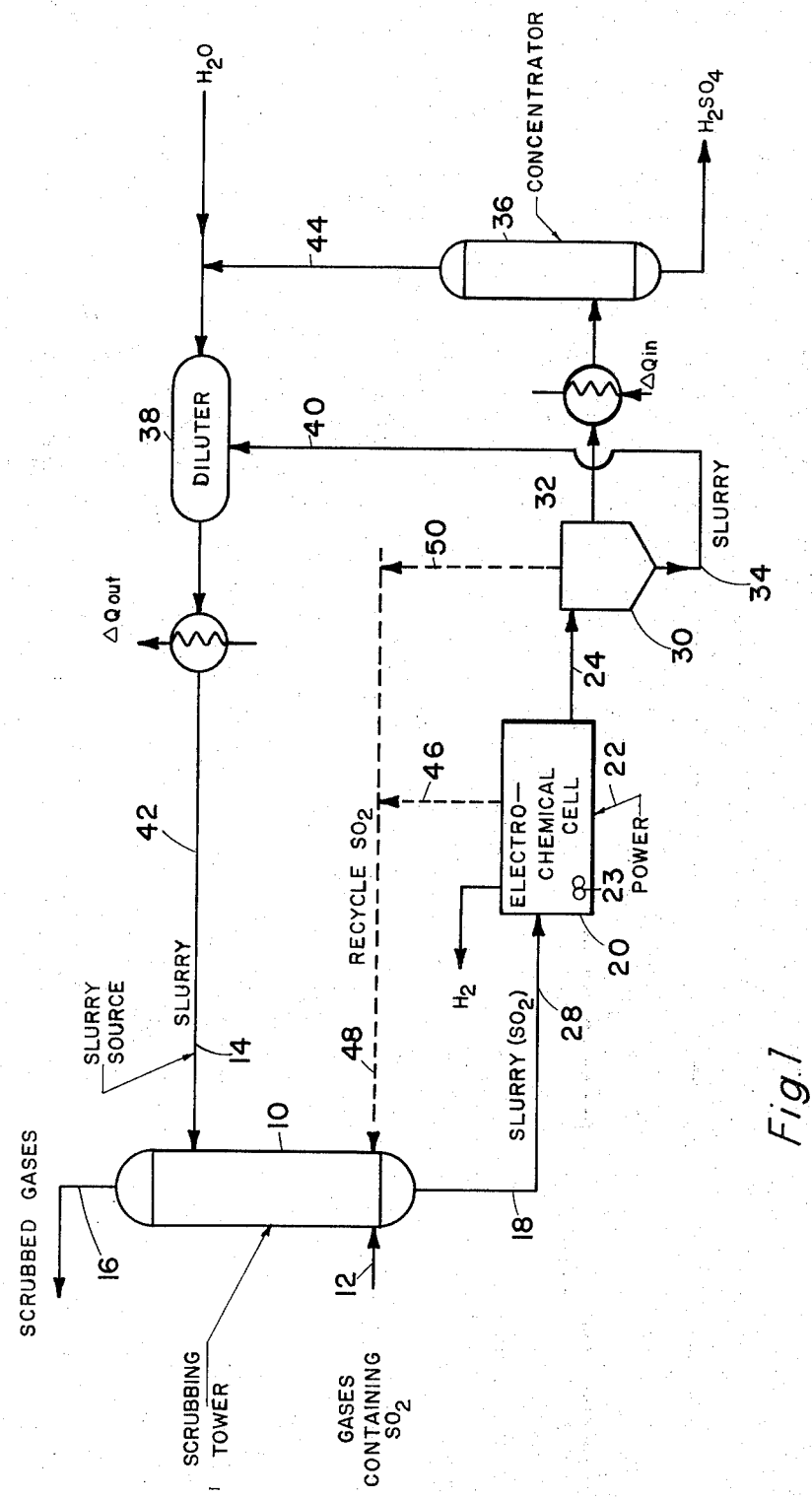
FIG. 1 represents a flow diagram of one embodiment of the process and apparatus of the invention used in removing sulfur dioxide from waste gases and converting the sulfur dioxide to sulfuric acid.

Particularly suitable as particulate pollutant-adsorbent material is lignite carbon such as described by Billinge in "The Chemisorption of Sulphur Dioxide on Carbons"—Second Conference on Industrial Carbon and Graphite, London, Apr. 7–9, 1965. Such carbon has a sulfur dioxide adsorptive capacity of 5 to 15 g. per 100 g. of carbon and is substantially corrosion resistant to sulfuric acid and has good semi-conducting properties. As a particular example the adsorbent employed herein may be carbon particles having an average particle size of within the range of from about 0.05 to about 10 microns and that the aqueous slurry has a concentration of carbon particles of from about 0.1 to about 50% by weight and a acidic pH of within the range of from about 0 to about 7.

Scrubbing tower 10 also includes outlet 16 for scrubbed gases and outlet 18 for slurry containing carbon particles having sulfur dioxide adsorbed thereon. The waste gas scrubbing means or tower 10 can take the form of any conventional scrubbing apparatus as described in any of the prior art patents referred to hereinbefore as will be apparent to one skilled in the art.

Electrochemical cell 20 is provided with a power source 22, stirring means 23 for example a magnetic stirring bar and includes outlet 24 for product-reaction mixture, outlet or vent 26 for hydrogen, and inlet 28 for feed slurry of carbon particles having sulfur dioxide adsorbed thereon. The cell 20 is in communication with the outlet 18 for slurry leaving the scrubbing tower 10. A detailed description of the electrochemical cell is set out hereinafter.

Separator means 30 for separating the reaction mixture from electrochemical cell 20 into slurry and sulfuric acid includes outlet 32 for sulfuric acid mixture and outlet 34 for slurry of carbon particles. Its inlet is in communication with outlet 24 of electrochemical cell 20. Such separation means can take the form of conventional liquid-solid separation apparatus known in the art.

The system of FIG. 1 also includes a sulfuric acid concentrator 36 which is in communication with sulfuric acid mixture outlet 32 of the separation means 30.

The system further includes slurry dilution means 38 which is in communication with slurry outlet 34 of the separation means 30. As shown, slurry from the separation means 30 can be fed to dilutor 38 via outlet 34 (and conduit 40) and mixed with water until the desired slurry concentration is attained. Thereafter, the slurry can be recycled via line 42 back to the scrubbing tower 10 for further use. Water collected from concentrator 36 may be fed via conduit 44 to the dilution means 38.

As suggested by the dotted lines, unreacted sulfur dioxide may be recycled back from the electrochemical cell via conduits 46 and 48 or from the separator means 30 via conduits 50 and 48 back to the scrubbing tower 10 so that it may be adsorbed by carbon particles and then fed as part of the slurry feed back to the electrochemical cell via inlet 28.

Figure 2:
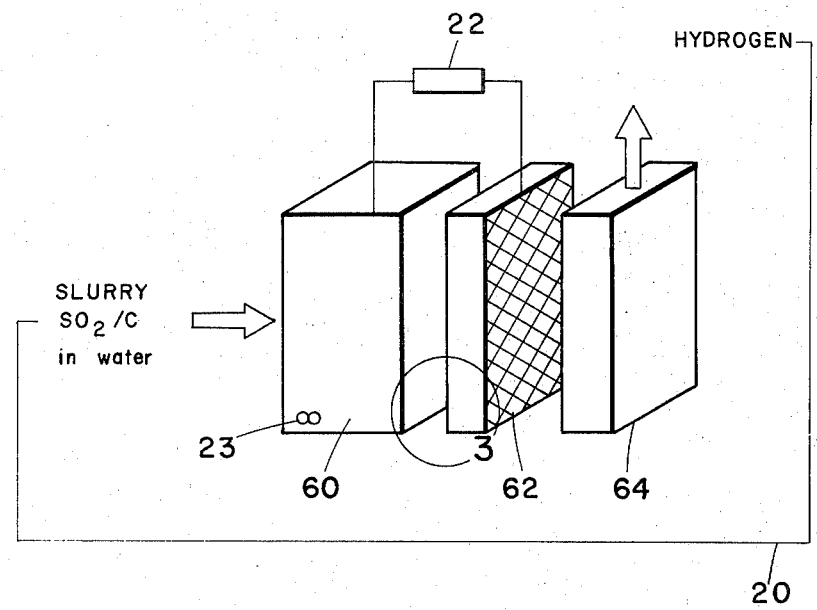
FIG. 2 is a schematic drawing of the electrochemical cell employed in the flow diagram of FIG. 1.

The electrochemical cell employed in FIG. 1 is shown schematically in FIG. 2 and includes a metallic cell or slurry electrode compartment 60 which, together with the slurry of carbon particles containing adsorbed sulfur dioxide, forms the anode; an ion exchange membrane separator or other diaphragm means 62 for separating the products of the anode and cathode, a counterelectrode such as a hydrogen electrode 64 which functions as the cathode and an electrolyte which is comprised of the aqueous solution which is part of the aqueous slurry. DC power source 22 is operatively connected to the anode slurry electrode compartment 60 and cathode 64.

In FIG. 2, the slurry electrode can be seen comprised of particles of carbon containing adsorbed sulfur dioxide suspended in an aqueous solution of slightly acidic pH as described hereinbefore (such aqueous solution also comprising the electrolyte). The counterelectrode or cathode, as noted, can take the form of any conventional hydrogen electrode, such as a quasi-reversible porous hydrogen electrode.

The ion exchange membrane 62 employed herein is generally a cation permselective membrane commonly of the type consisting of cation exchange substance in the form of thin sheets; said membranes being substantially hydraulically impermeable to water and to ions carrying a negative charge but permeable to ions carrying a positive charge. The art contains many examples of cation exchange materials which can be formed into cation permselective membranes. Preferable cation membranes are conventional self-supporting sulfonic acid type membranes which are well known in the art.

The metallic cell compartment which forms the current collector and is part of the anode can be made up of any acid resistant metal such as stainless steel, lead, lead alloys of silver, antimony, tellurium and tallium, platinum or platinum-coated electrolytic valve metals.

The stationary electrode as opposed to the slurry or moving electrode may comprise, in addition to a hydrogen electrode, any conventional electrode structure suitable for the particular oxidation-reduction reaction to be carried out.

In the practice of the system of the invention illustrated in the Figures, for removing sulfur dioxide from waste gases employing the above electrochemical cell, waste gases such as flue gases produced in a combustion process, such as carried out in coal or liquid fuel power plants, containing from about 100 p.p.m. to about 5 percent by weight sulfur dioxide is fed via inlet 12 into scrubbing tower 10 which can be in the form of a countercurrent spray tower. The waste gases containing 100 p.p.m. to 5 percent $SO_2$ are fed to the scrubbing tower in a mass ratio to the slurry of particulate material of within the range of from about 0.001:1 to about 50:1 and preferably from about 0.1:1 to about 10:1. The slurry which contains from about 1 to about 100 grams per liter carbon particles having an average particle size within the range of from about 0.1 to about 2 microns, and preferably from about 0.5 to about 1.2 microns, and the waste gases are fed into the scrubbing tower. A constant flow of slurry of carbon particles having sulfur dioxide adsorbed thereon leaves the scrubbing tower via outlet 18 and enters the electrochemical cell 20. Scrubbed waste gases exit scrubbing tower 10 via outlet 16. The slurry of carbon particles having sulfur dioxide adsorbed thereon is passed as a feed solution into the slurry electrode compartment 60 and a voltage of about 0.5 to about 1.3 volts is applied via the source 22 across the electrodes. The ion exchange membrane separator which is a cation exchange membrane comprised of a sheet of sulfonated polystyrene or a sheet of perfluorinated ion exchange membrane acts as a partition between the anode compartment 60 and the cathode 64 and prevents bulk mixing of the products of the anode and cathode. However, passage of aqueous solution (as electrolyte) is allowed therethrough. The carbon particles containing the adsorbed sulfur dioxide contact the metallic cell compartment 60 and reaction occurs at all metallic surfaces composing the anode metallic cell compartment between sulfur dioxide and water to form sulfuric acid plus two protons and two electrons; at the cathode the two protons are converted to molecular hydrogen. Thus, the overall process comprises reaction of sulfur dioxide and water to form sulfuric acid and molecular hydrogen, which can be summarized as follows:

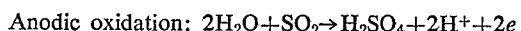
Anodic oxidation: $2H_2O + SO_2 \rightarrow H_2SO_4 + 2H^+ + 2e$
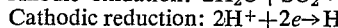
Cathodic reduction: $2H^+ + 2e \rightarrow H_2$
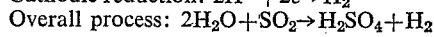
Overall process: $2H_2O + SO_2 \rightarrow H_2SO_4 + H_2$ The hydrogen can be vented or collected via outlet 26 of the electrochemical cell. Sulfuric acid in the form of an aqueous solution including particles of carbon is passed to the separator means 30 wherein the slurry of carbon particles is separated from the sulfuric acid. The slurry can then be passed via line 40 to slurry dilution means 38 wherein it is combined with additional water so that the desired concentration of carbon particles in the slurry is achieved. The slurry can then be recycled via line 42 back to the scrubbing tank or tower 10. The sulfuric acid from the separator means 30 can be passed via line 32 to concentrator 36 wherein water is removed therefrom and sulfuric acid is collected as product. The water from the concentrator may be passed via line 44 to the dilutor 38.

If desired, the sulfur dioxide removed from the waste gases may be converted to sodium dithionite, instead of sulfuric acid, in which case the slurry or dispersed electrode will comprise the cathode and the anode can comprise a conventional stationary electrode. Sodium hydroxide solution is introduced as anolyte feed and the slurry of particulate material containing adsorbed sulfur dioxide in conjunction with the current collector or metallic cell compartment will comprise the cathode. As in the cell shown in the Figures, a cation specific membrane is employed to separate the anode and cathode chambers of the cell. Sulfur dioxide in water is converted to dithionite across the cathode. Sodium ions are supplied from the anolyte solution to the catholyte for reaction with the dithionite to form sodium dithionite. The actual reactions occurring in the cell are as follows:

Anode oxidation: $4NaOH \rightarrow 4Na^+ + O_2 + 2H_2O + 4e^-$
Cathode reduction: $4SO_2 + 4e^- \rightarrow 2S_2O_4^=$
Overall process: $4NaOH + 4SO_2 \rightarrow 2Na_2S_2O_4 + O_2 + 2H_2O$ Similar electrochemical cells can be employed to convert carbon monoxide and hydrocarbons by oxidation to carbon dioxide. Furthermore, in accordance with the process and apparatus of the invention, hydrazine, hydrogen sulfide, ammonia and oxides of nitrogen can be removed from waste gases and electro-oxidized in a similar manner to less-toxic or less-noxious materials.

GENERAL PROCESS DESCRIPTION

Generally in carrying out the removal of pollutants from waste gases, the type of slurry of particulate adsorbent material employed will depend upon the pollutants to be removed and the type of waste gases processed.

The characteristics of the particulate adsorbent material whether it be carbon (which adsorbs sulfur dioxide) or other pollutant adsorbent material is critical for both the pollutant (e.g. sulfur dioxide) removal step and the electrochemical conversion of the pollutant to the desired material. Depending upon the pollutants to be removed and the final products or materials desired, and the efficiency of operation required in order to make the process commercially feasible, the adsorbent characteristics such as density, particle size, surface area and porosity are controlled to achieve the desired results. These adsorbent characteristics have a direct bearing on materials settling rate, adsorptive capacity, catalytic activity during the electrochemical process and resistance to corrosion.

Normally, the slurry will have a concentration of particulate material within the range of from about 0.1 to about 50% by weight and preferably from about 1 to about 10% by weight thereof; the particulate material having an average particle size of within the range of from about 0.01 to about 10 microns and preferably from about 0.1 to about 1.0 microns, and a surface area within the range of from about 0.1 to about 500 m.$^2$/g. and preferably from about 1 to about 100 m.$^2$/g., and at a density such that the particles will remain suspended in the slurry medium under the operating conditions of the scrubber and electrochemical cell.

The pH of the aqueous solution in which the particulate adsorbent material is suspended is adjusted such that certain pollutants may be adsorbed or rejected. Thus, for example, where it is desired to remove sulfur dioxide, other pollutants (such as oxides of nitrogen, carbon monoxide or any of the other pollutants mentioned herein) may be adsorbed simultaneously or preferentially desorbed. In such case, carbon may be employed as the adsorbent, and the pH of the slurry adjusted to within the range of from about 0 to about 7 and preferably from about 0.1 to about 3 (for acidic media), by adding to the slurry acids or stable buffers such as alkali metal phosphates or borates, for example, sodium phosphates and sodium borate. The result is that carbon dioxide is rejected (not adsorbed) and is vented with the scrubbed waste gases.

It will be understood that where pollutants such as ammonia or hydrazine are to be removed from waste gases and converted into other materials, the slurry of adsorbent containing adsorbed hydrazine and/or ammonia will have a neutral or an alkaline pH of within the range of from about 7 to about 14 and preferably from about 11 to about 13. In this case, hydroxyl ions participate in the transport of current. The pH of such slurry can be adjusted and maintained through the use of stable buffers such as alkali metal carbonates or bicarbonates such as sodium carbonate or sodium bicarbonate.

Another important factor in determining efficiency of the pollutant removal step is the flow rate of waste gases vis-a-vis the flow rate of slurry of particulate material to be contacted with the waste gases. The flow rates of these streams will depend on rate of adsorption of pollutant on the particulate material and the quantity of pollutant adsorbed/adsorbant weight. Generally sufficient slurry will be employed to ensure substantially complete removal of pollutants from the waste gas.

Temperatures of each of the slurry and waste gas streams as well as residence time in the scrubber means may have a bearing on pollutant removal efficiency. Thus, to ensure efficient operation, the temperature of the waste gases may optionally be cooled to the temperature of the slurry of particulate material, and the temperature of the slurry of particulate material may range from slightly above the freezing point of the slurry to below the maximum temperature compatible with the ion exchange membrance (e.g. 125° C.).

The slurry of particulate material should be made to contact the waste gases for sufficient time to enable the particulate material to adsorb the desired pollutants thereon. Optimally, the contact time should be sufficient so that the particulate material adsorbs substantially its entire capacity of pollutants. However, this is not necessary inasmuch as the amount of particulate material employed and the adsorptive capacity thereof will be substantially greater than that necessary to remove substantially all of the pollutants from the waste gases.

It will be understood that adsorbents or catalysts as set out hereinbefore with respect to sulfur dioxide recovery and conversion, with or without carriers, may be employed to remove pollutants such as hydrocarbons ($C_1$ to $C_8$ alkanes), hydrazine (employing a neutral or alkaline slurry), hydrogen sulfide, carbon monoxide, nitrogen oxides such as nitrogen oxide and nitrogen dioxide, and ammonia (neutral or alkaline slurry) from waste gases.

In carrying out the conversion of the pollutants adsorbed on the particulate material by electrochemical means, the concentration of pollutants in the slurry and the flow rate of slurry into the electrochemical cell as well as the capacity of the electrochemical cell is designed and adjusted to most efficiently carry out the electrochemical conversion process. The concentration of pollutant in the slurry can be adjusted by adding or removing water from the slurry until the desired concentration is attained. Thus, the present system has the capability of handling any waste gases regardless of the source, whether it be flue gases or smelter gases or the like.

Actual electrochemical conversion or reaction of the pollutants will occur on the surfaces of the metallic cell compartments (current collector). Such reaction is facilitated by employing a metallic cell compartment having a high surface area, such as a metallic screen structure or other high surface area structure, as opposed to a flat metallic surface which however may also be employed if desired. The electrochemical conversion should be carried out with stirring or agitation of the slurry within the cell employing finely divided particles, such as even colloidal particles, to ensure high frequency of particle contact with the metallic cell compartment. The flow rate of the slurry of particles having pollutants adsorbed thereon should be adjusted so that the particulate material and pollutants thereon will have sufficient time in contact with the metallic surface of the current collector so that substantially complete reaction may be achieved.

It will be apparent to one skilled in the art that in electrochemically converting the pollutant to the desired material, the slurry electrode may be employed in conjunction with the metallic cell compartment as the anode or cathode depending upon whether the reaction at the slurry electrode necessary to convert the pollutant into the desired material is an oxidation reaction or a reduction reaction.

Although the invention has been described in terms of the use of a single electrochemical cell, it will be understood that a plurality of such cells can be employed to form a multicell electrochemical conversion apparatus or stack.

The process and apparatus of the invention provides a rather simple solution to a rather complex problem, namely of removing pollutants from waste gases and efficiently converting the pollutants electrochemically to desired materials. The process and apparatus are particularly advantageous over prior art processes and apparatus in that they are easily added-on to existing plants wherein waste gases are produced, they can effectively and efficiently produce marketable by-products such as sulfuric acid and hydrogen and can regenerate adsorbent for recycling for further use; they can operate on lower power requirements as compared to more expensive prior art procedures, and they are capable of operating on all types of waste gases containing small or large concentrations of pollutants. Furthermore, the process and apparatus of the invention can be designed to preferentially adsorb or desorb various components of waste gases, and can effect rejection of carbon dioxide so that it need not be carried along to increase the load handled by the electrochemical cell.

The waste gases may contain more than one pollutant, for example, $SO_2$, $H_2S$ and CO and/or nitrogen oxides such as NO or $NO_2$ and/or mercaptans such as methyl mercaptan or ethyl mercaptan. In such case, through judicious selection of adsorbent material, the pollutants can be separately or simultaneously adsorbed from the waste gases on to the adsorbent material and thereafter electrochemically converted to the desired materials in accordance with the invention.

The following Examples are illustrative of the invention and represent preferred embodiments hereof.

EXAMPLE I

This Example is directed to the removal of sulfur dioxide from flue gases produced in the combustion of a 1% sulfur coal in a 500 negawatt power plant, and conversion of the sulfur dioxide to sulfuric acid.

The apparatus set up as shown in the accompanying Figures and described above is employed.

The scrubbing tower comprises a countercurrent spray tower, 10 feet in diameter and 16 feet high and capable of handling 3300 gal./min. of slurry and operates at a residence time of about 1 min.

The electrochemical cell comprises 6 batteries (each 5 ft. x 5 ft. x 10 ft. or 250 ft.$^2$), which includes 600 cells, each cell having an area of 20 ft.$^2$. The electrochemical cell has a power requirement of $2.9 \times 10^3$ kw. and a cell power output of 250 watts/ft.$^2$. Each cell includes a metallic cell compartment, a sulfonated polystyrene cation exchange membrane and a counter-electrode or hydrogen electrode which is a standard electrode.

An aqueous slurry containing 10 percent carbon particles (having an average particle size of about 1 micron) and having a pH of about 2 at a temperature of about 80° C. is introduced at a rate of 800 tons/hr. into the scrubbing tower. Waste gases at a temperature of about 40° C. obtained from the combustion of the 1% sulfur coal having the following composition is fed at a flow rate of 4 tons/hr. into the scrubbing tower.

| Component of waste gas: | Percentage |
|---|---|
| $SO_2$ | 1.45 |
| $CO_2$ | 5.1 |
| CO | <1 |
| $O_2$ | 2 |
| $N_2$ | 70 |
| $H_2O$ | 21 |

A steady stream of slurry of carbon particles having sulfur dioxide adsorbed thereon is fed from the scrubbing tower at a rate of about 3300 gal./min. to the electrochemical cell shown in the Figures. The voltage employed in the electrochemical cell is about 1 volt DC per cell and the temperature of the cell is maintained at about 80° F.

Reaction occurs on the surface of the metallic cell compartment (which acts as a current collector) between the sulfur dioxide and water to form sulfuric acid. At the cathode, atomic hydrogen is converted to molecular hydrogen (43,000 ft.$^3$/hr.).

Slurry of carbon particles containing sulfuric acid is passed at a rate of about 12,000 lb./hr. from the electrochemical cell to the separator means which is in the form of a 10,000 gallons circular settling tank. The slurry recovered from the separator means 30 is passed via line 40 to dilutor 38 where it is combined with water from an outside source or with water from the concentrator 36 so that the desired concentration of carbon particles in the slurry is attained. Thereafter, the slurry is recycled via line 42 back to the scrubbing tower 10. If desired additional slurry may be added from an external slurry source to the scrubbing tower. Sulfuric acid solution from the separator means 30 can be passed to the concentrator 36 and sulfuric acid of desired concentration collected therefrom.

EXAMPLE II

Figure 3:
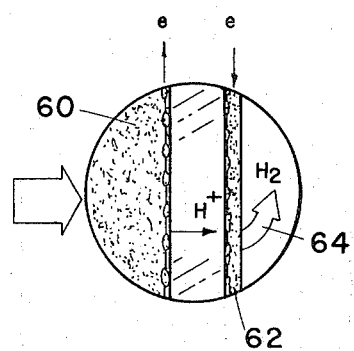
FIG. 3 shows an enlarged sectional view of the electrochemical cell illustrated in FIG. 2.

Employing an apparatus setup similar to that shown in FIGS. 1, 2 and 3, hydrocarbon such as hexane or octane or propane or carbon monoxide may be removed from waste gases by scrubbing the waste gases containing such pollutants in the scrubbing tower with a slurry of carbon particles or other particulate material such as and the slurry of particulate adsorbent passed to the electrochemical cell wherein the hydrocarbons or carbon monoxide may be reacted with water and converted to carbon dioxide.

What is claimed is:

1. A process for the removal of pollutants from waste gases and conversion of such pollutants into desired materials, which comprises: treating a waste gas stream containing pollutant(s) with an aqueous slurry of particulate pollutant-adsorbent material suspended in aqueous solution to cause the pollutant(s) to be adsorbed on the suspended particulate material, and electrochemically treating the aqueous slurry of the particulate material having pollutant(s) adsorbed thereon in an electrochemical cell containing a cation exchange membrane or diaphragm to preclude short circuits and reaction product mixing therein and employing such slurry as a slurry electrode to convert the pollutant(s) into desirable product(s) or less-toxic or less-noxious materials, by passing said slurry to one side of said electrochemical cell, whereby said slurry functions as an electrode of said cell, agitating said slurry, and applying a direct current potential source across said cell causing the pollutant(s) to undergo an oxidation-reduction process to thereby convert the pollutant(s) into the desired products.

2. A process for the removal of sulfur dioxide from waste gases and conversion of the removed sulfur dioxide into sulfuric acid, which comprises: contacting a waste gas stream containing sulfur dioxide with a slurry of particulate sulfur dioxide-adsorbent material suspended in aqueous solution, thereby causing sulfur dioxide to be removed from the waste gases and be adsorbed on the particulate material; passing the slurry of the particulate material having sulfur dioxide adsorbed thereon to one side of an electrochemical cell including an anode, a cathode and means for separating the products of the anode and cathode, wherein said slurry functions as one electrode of said cell agitating said slurry; applying a direct current potential source across said cell thereby reacting said sulphur dioxide and water of said slurry at said slurry electrode in an oxidation-reduction process to form sulfuric acid; and recovering sulfuric acid from said slurry.

3. A process in accordance with Claim 2, wherein the cathode of said electrochemical cell comprises a stationary electrode and the anode comprising a metallic cell compartment and the slurry electrode in the form of the aqueous slurry of particulate material having sulfur dioxide adsorbed thereon, said metallic cell compartment functioning as a current collector and site for reaction of sulfur dioxide with water.

4. A process in accordance with Claim 2, wherein the aqueous slurry has a pH within the range of about 0 to about 7.

5. A process in accordance with claim 2, wherein the particulate material is carbon having a particle size within the range of from about 0.1 to about 1.0 microns.

References Cited
UNITED STATES PATENTS

| | | | |
|---|---|---|---|
| 3,736,238 | 5/1973 | Kruesi et al. | 204—105 R |
| 3,654,103 | 4/1972 | McRae | 204—130 |

JOHN H. MACK, Primary Examiner

R. L. ANDREWS, Assistant Examiner